(12) United States Patent
Cattani et al.

(10) Patent No.: US 9,416,696 B2
(45) Date of Patent: Aug. 16, 2016

(54) OIL PROPERTY MANAGEMENT SYSTEM AND METHOD FOR INTERNAL COMBUSTION ENGINE FUEL ECONOMY AND MINIMUM WEAR RATES

(71) Applicants: Luis Carlos Cattani, Aurora, IL (US); Scott A. Beatty, La Grange, IL (US); Kenneth P. Ceynow, Oak Lawn, IL (US); Joseph William August, Elmhurst, IL (US)

(72) Inventors: Luis Carlos Cattani, Aurora, IL (US); Scott A. Beatty, La Grange, IL (US); Kenneth P. Ceynow, Oak Lawn, IL (US); Joseph William August, Elmhurst, IL (US)

(73) Assignee: International Engine Intellectual Property Company, LLC, Lisle (IL)

( * ) Notice: Subject to any disclaimer, the term of this patent is extended or adjusted under 35 U.S.C. 154(b) by 276 days.

(21) Appl. No.: 14/027,435

(22) Filed: Sep. 16, 2013

(65) Prior Publication Data

US 2015/0075481 A1 Mar. 19, 2015

(51) Int. Cl.
*F01M 5/00* (2006.01)
*F01N 5/02* (2006.01)

(52) U.S. Cl.
CPC .............. *F01M 5/005* (2013.01); *F01N 5/02* (2013.01); *Y02T 10/16* (2013.01)

(58) Field of Classification Search
CPC ......... F01M 5/00; F01M 5/001; F01M 5/002; F01M 2005/004; F01M 5/005; F01M 5/007
See application file for complete search history.

(56) References Cited

U.S. PATENT DOCUMENTS

| 2,540,629 | A | * | 2/1951 | Miller | .................... F01M 5/007 165/280 |
|---|---|---|---|---|---|
| 6,901,788 | B2 | | 6/2005 | Han | |
| 2012/0210713 | A1 | * | 8/2012 | Ernst | ......................... F01N 5/02 60/615 |
| 2013/0180478 | A1 | * | 7/2013 | Ceynow | ................. F01M 5/005 123/41.08 |

* cited by examiner

*Primary Examiner* — Lindsay Low
*Assistant Examiner* — Jacob Amick
(74) *Attorney, Agent, or Firm* — Jack D. Nimz; Jeffrey P. Calfa

(57) ABSTRACT

A system and method for managing the characteristics of engine oil in a lubrication system for an internal combustion engine is disclosed. Generally speaking, the method includes the steps of determining a target viscosity for the engine oil based on engine speed and engine load, determining a working viscosity which may be directly measured or determined based on engine oil temperature and engine oil type, comparing the target viscosity to the working viscosity, deriving a target engine oil temperature, and directing engine oil to one of an oil cooler, an oil heater, or neither when and until the target engine oil temperature is achieved. The oil viscosity management system includes an engine lubrication system having a volume of engine oil, a cooler coupled to the lubrication system, a heating mechanism also coupled to the lubrication system, a valving system for directing flow of the oil and coupled to each of the lubrication system, the cooler and the heating mechanism, a signal generator for generating a signal based on operational parameters of the engine, and an estimator for controlling the valving system in response to the signal.

31 Claims, 2 Drawing Sheets

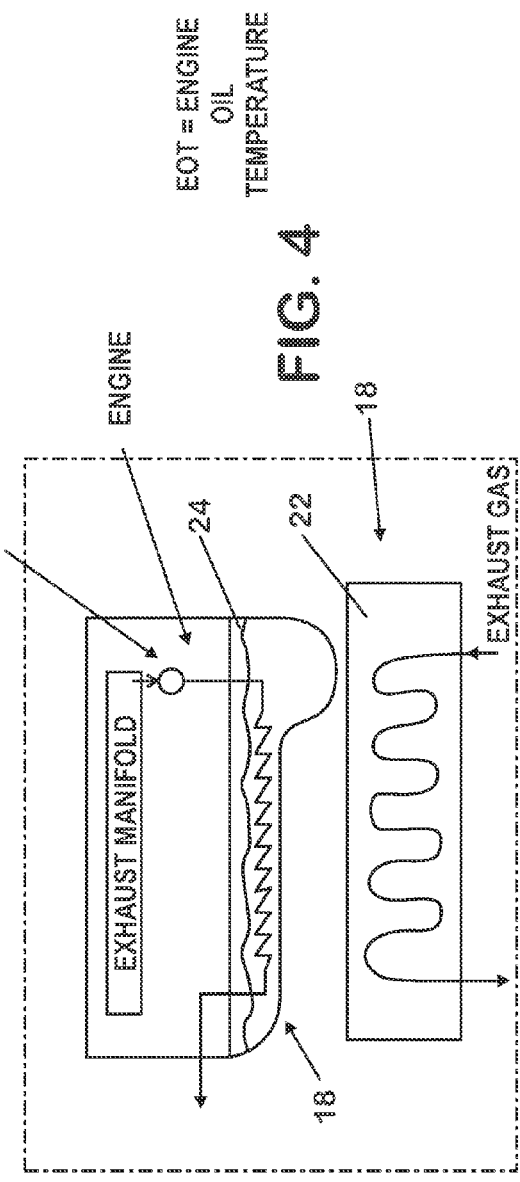
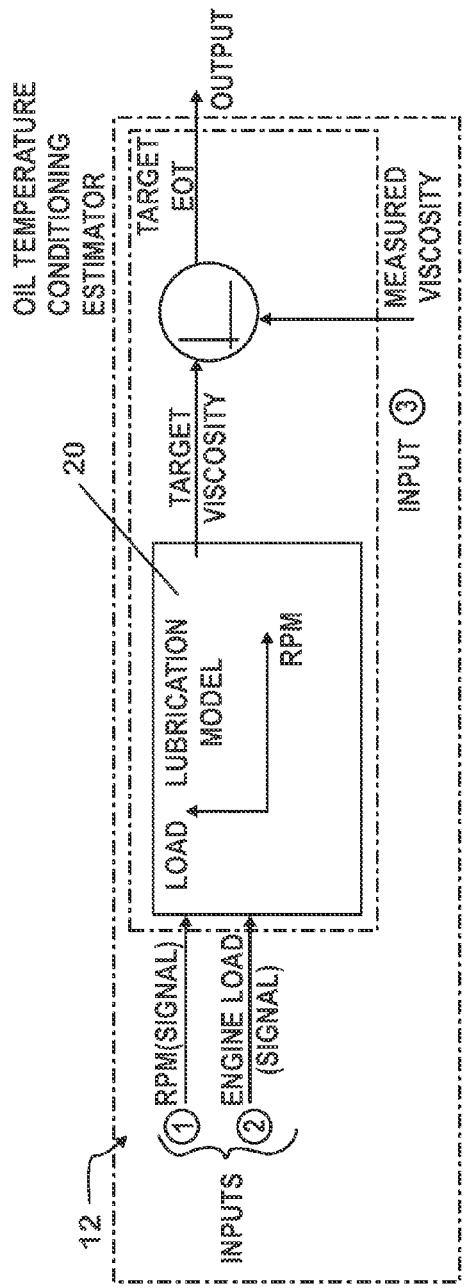
FIG. 4
FIG. 3

OIL PROPERTY MANAGEMENT SYSTEM AND METHOD FOR INTERNAL COMBUSTION ENGINE FUEL ECONOMY AND MINIMUM WEAR RATES

TECHNICAL FIELD

The present device and methods relate to engine oil management for an internal combustion engine. Specifically, the device relates to a system for accurately controlling the viscosity of engine oil based on operating parameters of the engine, while the methods relate to operation of the management system.

BACKGROUND OF THE INVENTION

The performance of an internal combustion engine is closely tied to fuel economy and operation temperature, which is in part a function of friction caused by the numerous moving parts of an engine. Engine oils have been engineered to provide adequate lubrication to such parts over a wide range of viscosities. However, optimizing viscosity to increase engine performance can be accomplished by controlling the engine oil temperature.

Current systems use a thermostat to bypass an engine oil cooler when the oil temperature drops below a specified threshold. This allows the engine oil temperature to be raised until the threshold is met and the bypass is closed. Then the engine oil begins to be cooled once again by passing through the engine oil cooler.

There are several problems with the simple thermostat system. First, bypassing the engine oil cooler is a slow method for raising the engine oil temperature. Second, bypassing the engine oil cooler may be insufficient for raising the engine oil temperature to the specific threshold. Finally, the engine oil temperature is the only parameter considered in changing the engine oil viscosity. Accordingly, the simple thermostat system cannot be counted on for optimizing engine oil viscosity and engine performance.

The present system and methods solve these and other problems in providing an engine oil management system for an internal combustion engine.

SUMMARY OF THE INVENTION

A method for managing the characteristics of engine oil in a lubrication system for an internal combustion engine is disclosed. Generally speaking, the method comprises the steps of determining a target viscosity for the engine oil based on engine speed and engine load, comparing the target viscosity to an actual viscosity of the engine oil, deriving a target engine oil temperature, and diverting engine oil to one of either an oil cooler or an oil heater until the target engine oil temperature is achieved. In a preferred embodiment, the step of determining a target viscosity for the engine oil is comprised of receiving an engine speed input signal, receiving an engine load input signal, and then ascertaining the target viscosity from a lubrication model based on engine speed and engine load.

Similarly, the step of determining a target viscosity of the engine oil may comprise the steps of providing an engine speed input signal to an estimator, and providing an engine load input signal to the estimator. The estimator then controls one of two preferred engine oil diverting mechanisms: a three-way valve, or two bypass valves. Such valves operate to open and close alternate paths to divert engine oil from an oil cooler to a heating mechanism or to merely bypass the cooler, as necessary. Regular circulation of the engine oil is restored once engine oil temperature is within desired parameters.

Further, an oil viscosity management system for an internal combustion engine is also disclosed. Generally speaking, the oil management system comprises an engine lubrication system having a requisite volume of engine oil, an engine oil cooler coupled to the lubrication system, an engine oil heating mechanism also coupled to the lubrication system, a valving system for directing flow of the engine oil and coupled to each of the lubrication system, the engine oil cooler and the engine oil heating mechanism, a signal generator for generating a signal based on operational parameters of the internal combustion engine, and an estimator for controlling the valving system in response to a signal received from the signal generator.

As with the disclosed methods, the valving system may use one of either two bypass valves or a three-way valve, to be controlled by the estimator. Additional components, such as an engine oil viscosity meter to measure actual engine oil viscosity, an engine oil temperature gauge for measuring an actual engine oil temperature, and the like, may also be included in the system for optimizing the engine oil viscosity.

These and other embodiments and their advantages can be more readily understood from a review of the following detailed description and the corresponding appended drawings.

BRIEF DESCRIPTION OF THE DRAWINGS

FIG. 3 is a schematic illustrating an embodiment of the estimator used in the engine oil viscosity management systems of FIG. 1 and FIG. 2; and FIG. 4 is a side view of an embodiment of an alternate engine oil heating mechanism using engine exhaust diverted through the oil sump.

DETAILED DESCRIPTION

Figure 2:
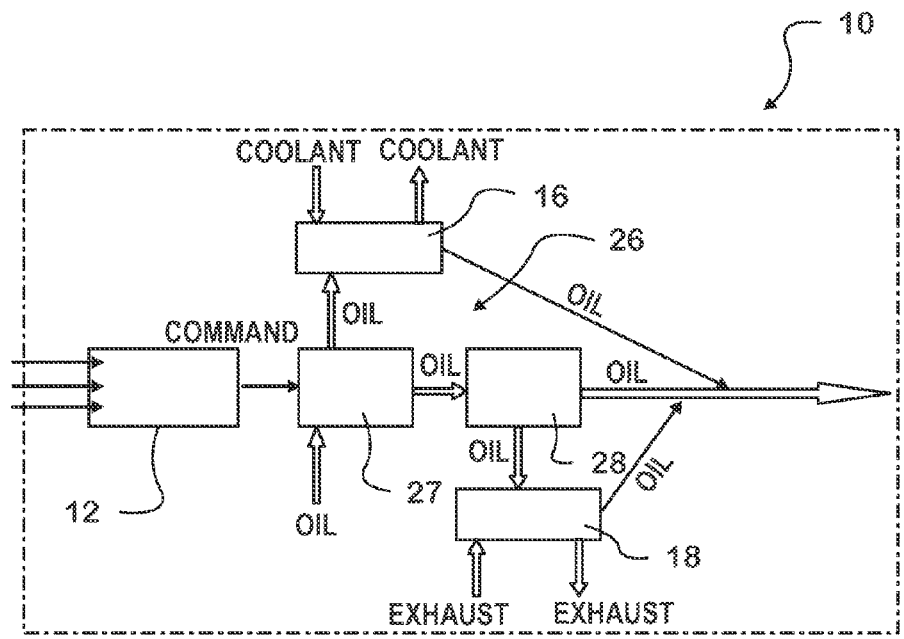
FIG. 2 is a schematic illustrating an alternate embodiment of the present engine oil viscosity management system having an exhaust-based heater and two bypass valves.

With reference to FIGS. 1-4, various embodiments of an engine oil management system are shown and consistently referenced by the number "10" throughout. Like components in the different embodiments are similarly referenced throughout the drawing figures and the following descriptions.

Figure 1:
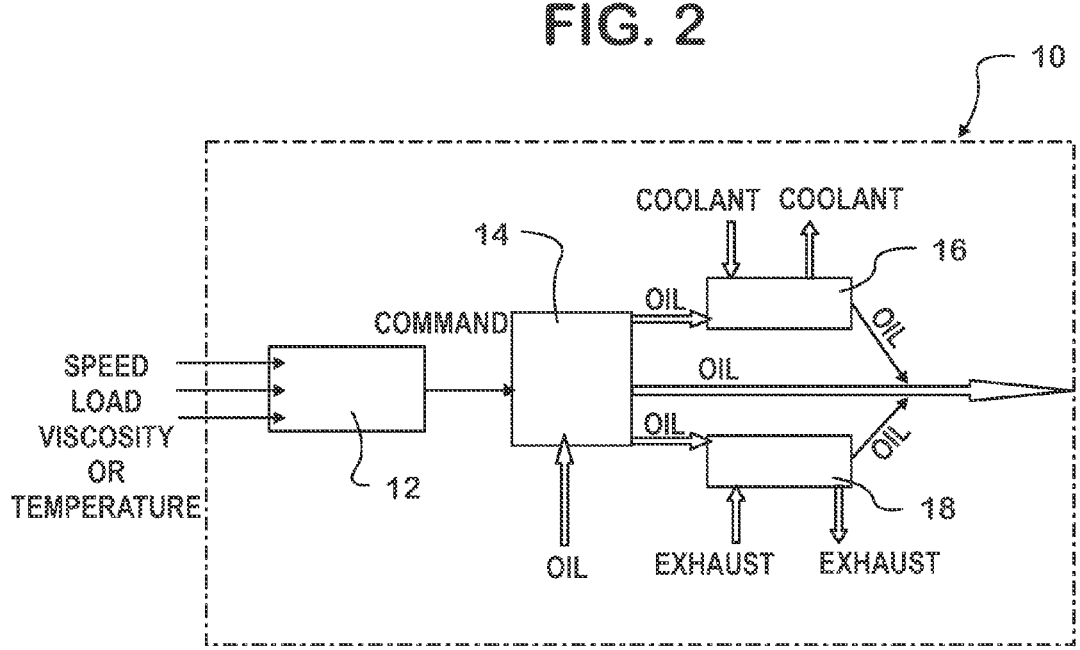
FIG. 1 is a schematic illustrating an embodiment of the present engine oil viscosity management system having an exhaust-based heater and a three-way valve.

In a first illustrated embodiment of FIG. 1, the system 10 is generally comprised of an engine oil temperature conditioning estimator 12, a three-way valve 14, an engine oil cooler 16, and an engine oil heating mechanism 18.

The estimator 12 accepts engine speed and engine load signals from sensors (not shown) typically used in internal combustion engines to monitor engine operation conditions. The values of these signals are input to a lubrication model 20 within the estimator 12. The lubrication model 20 is generally a table which identifies a target engine oil viscosity based on parameters such as engine load and engine speed (RPMs). Once the signal values are input and a target oil viscosity is determined, the estimator 12 compares the target viscosity to a working engine oil viscosity. The working engine oil viscosity may be determined in at least one of two preferred ways: using an oil viscosity gauge or by using a predictive model based on oil temperature and oil type. Once the working engine oil viscosity is determined (empirically or theoretically), the information is sent to the estimator 12, as well. The frequency for which these various measurements and determinations may be made, and the resulting signal output, is preferably on a continuous basis, though longer intervals may be adequate for some operations.

A viscosity-temperature model, also stored within the estimator 12, is used to compare the target engine oil viscosity and the determined (empirical or theoretical) working engine oil viscosity to derive a target engine oil temperature. An engine oil temperature sensor (not shown) inputs an actual oil temperature to the estimator 12 to determine whether the engine oil needs to be cooled or warmed for optimum operation.

When the actual engine oil temperature is higher than the target oil temperature, the estimator 12 sends a signal to the three-way valve 14. The output signal from the estimator 12 commands the valve 14 to maintain normal engine oil flow to an engine oil cooler 16 where the engine oil is cooled.

When the actual engine oil temperature is lower than the target oil temperature, the estimator 12 sends a different signal to the three-way valve 14. This output signal commands the valve 14 to divert the engine oil through a heating mechanism 18. The heating mechanism 18 may be comprised of a chamber 22 where the engine oil is heated. The heating chamber 22 may have an electric heating coil (not shown) or, as illustrated in FIGS. 1 and 2, engine exhaust may be passed through the chamber 22 on a closed path to heat the chamber contents, i.e., the engine oil. The valve 14 will continue to divert the engine oil to the heating mechanism 18 until subsequent readings determine the oil temperature to be within a desired temperature range.

Alternatively, the estimator 12 may divert engine exhaust gas through a closed path through the engine oil pan (sump) 24, as illustrated in FIG. 4. This is the preferred method for heating the engine oil as the larger volume of oil in the sump 24 allows for a more gradual, safer increase of oil temperature.

Of course, when the actual oil temperature is within an acceptable range of the target oil temperature, then a different path for the engine oil may be commanded by the estimator 12, bypassing both the cooler 16 and the heating mechanism 18. Continued measurement of engine operations are performed, possibly including the measurement of oil temperature and/or the determination of oil viscosity based on the measured oil temperature or, in an alternate embodiment, by direct measurement.

With reference to FIG. 2, where two bypass valves 26 are used in place of the three-way valve 14, operation is similar. The bypass valves 26 are controlled by the estimator 12. When the actual oil temperature is too high, a first bypass valve 27 is closed to flow engine oil to the engine oil cooler 16. When, and if, the target engine oil temperature is achieved, the bypass valve 27 may be opened to divert engine oil from the cooler 16 and into the second bypass valve 28, which is typically closed as well, resuming regular engine oil circulation.

However, when the actual oil temperature is too low (for example, at engine start up), the first bypass valve 27 will be opened to divert engine oil to the second bypass valve 28 which is also opened to divert engine oil through a heating mechanism 18, as described above. The second bypass valve may alternatively be used to divert engine exhaust through the oil sump 24, also as described above. As soon as the target oil temperature is achieved, the bypass valve 28 is closed and regular circulation of the engine oil or exhaust is resumed.

It should be understood that in most instances, weather and load conditions will dictate that the engine oil will need to be cooled. Accordingly, as explained above, engine oil flow through the engine oil cooler will constitute "regular circulation" in most cases.

What is claimed is:

1. A method for managing the characteristics of engine oil in a lubrication system for an internal combustion engine, the method comprising the steps of:
   determining a target viscosity for the engine oil based on engine speed and engine load;
   determining a working viscosity of the engine oil;
   comparing the target viscosity to the working viscosity of the engine oil;
   deriving a target engine oil temperature; and
   diverting engine oil to one of either an oil cooler or an oil heater until the target engine oil temperature is achieved.

2. The method of claim 1, wherein the step of determining a target viscosity for the engine oil comprises the steps of:
   receiving an engine speed input signal;
   receiving an engine load input signal; and
   ascertaining the target viscosity from a lubrication model based on engine speed and engine load.

3. The method of claim 1, wherein the steps determining a target viscosity, comparing the target viscosity to a working viscosity, and deriving a target oil temperature are performed by an estimator coupled to the lubrication system.

4. The method of claim 1, further comprising, before the step of determining a target viscosity, the steps of:
   providing an engine speed input signal to an estimator; and
   providing an engine load input signal to the estimator.

5. The method of claim 1, wherein the step of diverting engine oil comprises the step of controlling a three-way valve.

6. The method of claim 1, wherein the step of diverting engine oil comprises the step of controlling two bypass valves.

7. The method of claim 5, wherein the step of controlling a three-way valve is performed by an estimator.

8. The method of claim 6, wherein the step of controlling two bypass valves is performed by an estimator.

9. The method of claim 6, wherein the step of diverting engine oil comprises the steps of:
   controlling a first bypass valve to direct engine oil to an oil cooler to cool the engine oil when the actual engine oil temperature is higher than the target engine oil temperature; and
   controlling a second bypass valve to direct engine exhaust to flow by a closed path through an engine oil sump to heat the engine oil when the actual engine oil temperature is lower than the target engine oil temperature.

10. The method of claim 6, wherein the step of diverting engine oil comprises the steps of:
    controlling a first bypass valve to direct engine oil to an oil cooler to cool the engine oil when the actual engine oil temperature is higher than the target engine oil temperature; and
    controlling a second bypass valve to direct engine oil by a closed path to a heating mechanism to heat the engine oil when the actual engine oil temperature is lower than the target engine oil temperature.

11. The method of claim 6, wherein the step of determining a target viscosity is performed continuously by an estimator.

12. A method for managing the characteristics of engine oil in a lubrication system for an internal combustion engine, the method comprising the steps of:
    providing an engine speed input signal to an estimator;
    providing an engine load input signal to the estimator;

determining a target viscosity for the engine oil based on the engine speed input signal and the engine load input signal;

determining a working viscosity for the engine oil;

comparing the target viscosity to the working viscosity of the engine oil to determine a difference;

deriving a target engine oil temperature based on any difference determined;

comparing the target engine oil temperature to an actual engine oil temperature;

operating a first bypass valve to direct engine oil to an oil cooler to cool the engine oil when the actual engine oil temperature is higher than the target engine oil temperature; and operating a second bypass valve to direct engine exhaust to flow by a closed path through an engine oil sump to heat the engine oil when the actual engine oil temperature is lower than the target engine oil temperature.

13. The method of claim 12, wherein the step of determining a target viscosity is performed continuously by the estimator.

14. The method of claim 12, wherein the steps of opening the first bypass valve and opening the second bypass valve are performed by the estimator.

15. A method for managing the characteristics of engine oil in a lubrication system for an internal combustion engine, the method comprising the steps of:

continuously providing an engine speed input signal to an estimator;

continuously providing an engine load input signal to the estimator;

continuously determining a target viscosity for the engine oil based on the engine speed input signal and the engine load input signal;

continuously determining a working viscosity for the engine oil based on one of either a measured viscosity or a measured temperature;

continuously comparing the target viscosity to the working viscosity of the engine oil to determine a difference;

deriving a target engine oil temperature based on any viscosity difference determined;

comparing the target engine oil temperature to an actual engine oil temperature;

directing engine oil along a first route to an engine oil cooler to cool the engine oil when the actual engine oil temperature is higher than the target engine oil temperature;

directing engine oil along a second route to an engine oil heater to heat the engine oil when the actual engine oil temperature is lower than the target engine oil temperature; and directing engine oil along a third route when the actual engine oil temperature is within a predetermined range of the target engine oil temperature.

16. The method of claim 15, wherein the engine oil heater comprises the step of running engine exhaust gas through an engine oil sump by a closed path.

17. The method of claim 15, wherein the steps of directing engine oil a first route, a second route, and a third route are performed by a three-way valve.

18. The method of claim 17, wherein the three-way valve is controlled by the estimator.

19. An oil viscosity management system for an internal combustion engine, the system comprising:

an engine lubrication system having a requisite volume of engine oil which circulates through an internal combustion engine;

an engine oil cooler coupled to the lubrication system;

an engine oil heating mechanism coupled to the lubrication system;

a valving system for directing flow of the engine oil and coupled to each of the lubrication system, the engine oil cooler and the engine oil heating mechanism;

a signal generator for generating a signal based on operational parameters of the internal combustion engine wherein the signal generator generates one of either an engine speed signal, an engine load signal, or both; and an estimator for controlling the valving system in response to a signal received from the signal generator wherein the estimator determines a target engine oil viscosity based on the signal received from the signal generator.

20. The oil viscosity management system of claim 19, further comprising an engine oil viscosity meter to measure working engine oil viscosity.

21. The oil viscosity management system of claim 20, wherein the viscosity meter is electronically coupled to the estimator and the estimator compares the working engine oil viscosity to the target engine oil viscosity.

22. The oil viscosity management system of claim 21, wherein the estimator derives a target engine oil temperature based on any difference between the working engine oil viscosity and the target engine oil viscosity.

23. The oil viscosity management system of claim 22, further comprising an engine oil temperature gauge for measuring an actual engine oil temperature.

24. The oil viscosity management system of claim 23, wherein the valving system comprises two bypass valves, one coupled to the engine lubrication system and the engine oil cooler and one coupled to the engine lubrication system and the engine oil heating mechanism.

25. The oil viscosity management system of claim 23, wherein the valving system comprises a three-way valve coupled to the engine lubrication system, the engine oil cooler and the engine oil heating mechanism.

26. The oil viscosity management system of claim 19, wherein the estimator comprises a lubrication model for determining a target engine oil viscosity.

27. The oil viscosity management system of claim 19, wherein the valving system comprises two bypass valves, one coupled to the engine lubrication system and the engine oil cooler and one coupled to the engine lubrication system and the engine oil heating mechanism.

28. The oil viscosity management system of claim 19, wherein the valving system comprises a three-way valve coupled to the engine lubrication system, the engine oil cooler and the engine oil heating mechanism.

29. The oil viscosity management system of claim 19, wherein the engine oil heating mechanism comprises a closed path for engine exhaust to travel through an engine oil sump.

30. The oil viscosity management system of claim 29, wherein the heating mechanism comprises a bypass valve controlled by the estimator.

31. The oil viscosity management system of claim 24, wherein the engine oil heating mechanism comprises a closed path for engine exhaust to travel through an engine oil sump.

* * * * *